Figure 1:
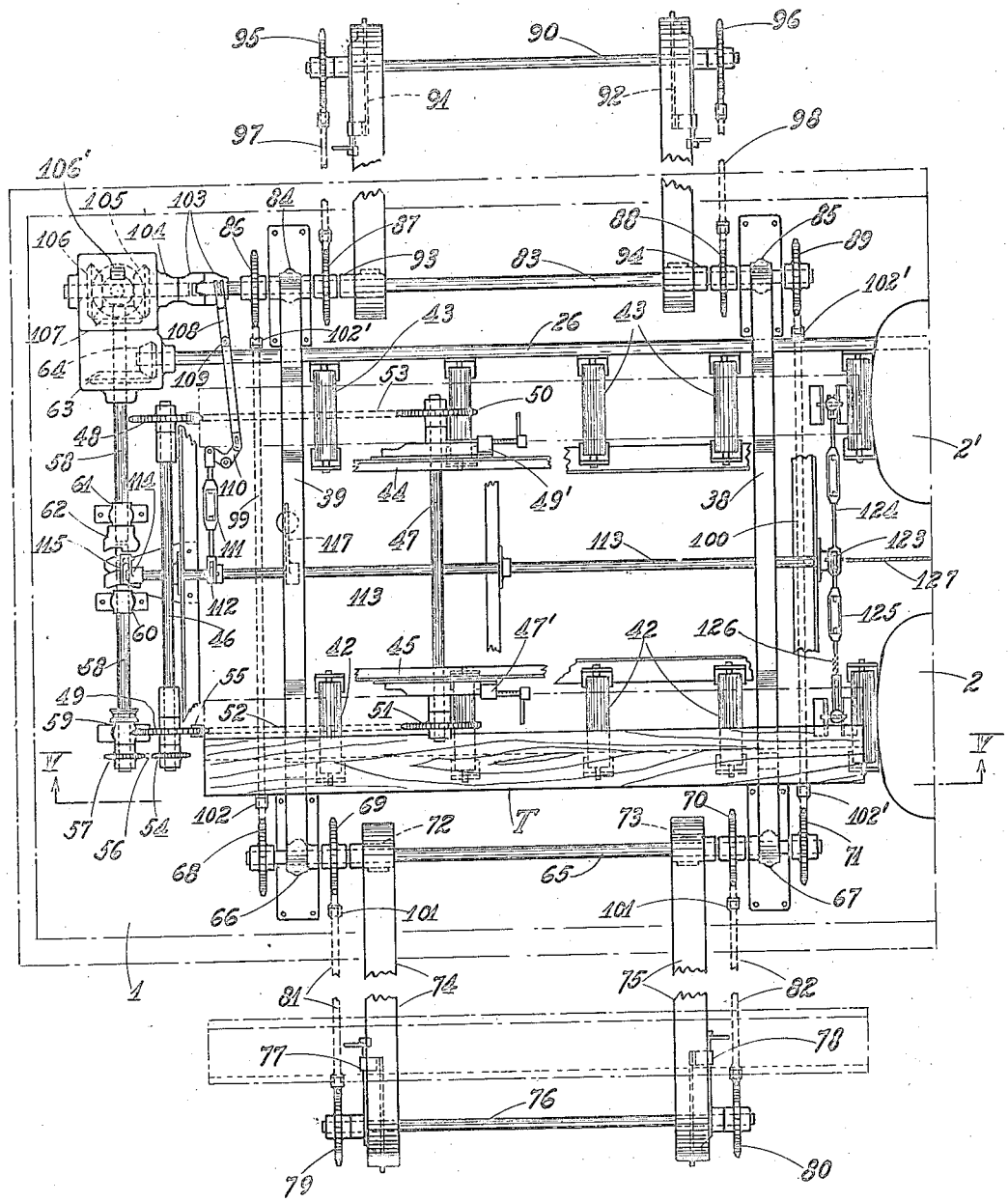

Dec. 18, 1923.  
G. B. SHIPLEY ET AL  
1,478,259

AUTOMATIC CHARGING AND DISCHARGING APPARATUS FOR WOOD TREATING PLANTS

Filed July 13, 1922  12 Sheets-Sheet 1

WITNESSES  
INVENTORS  
Grant B. Shipley  
and  
Jack B. Shipley  
By Winter & Brown  
ATTORNEYS

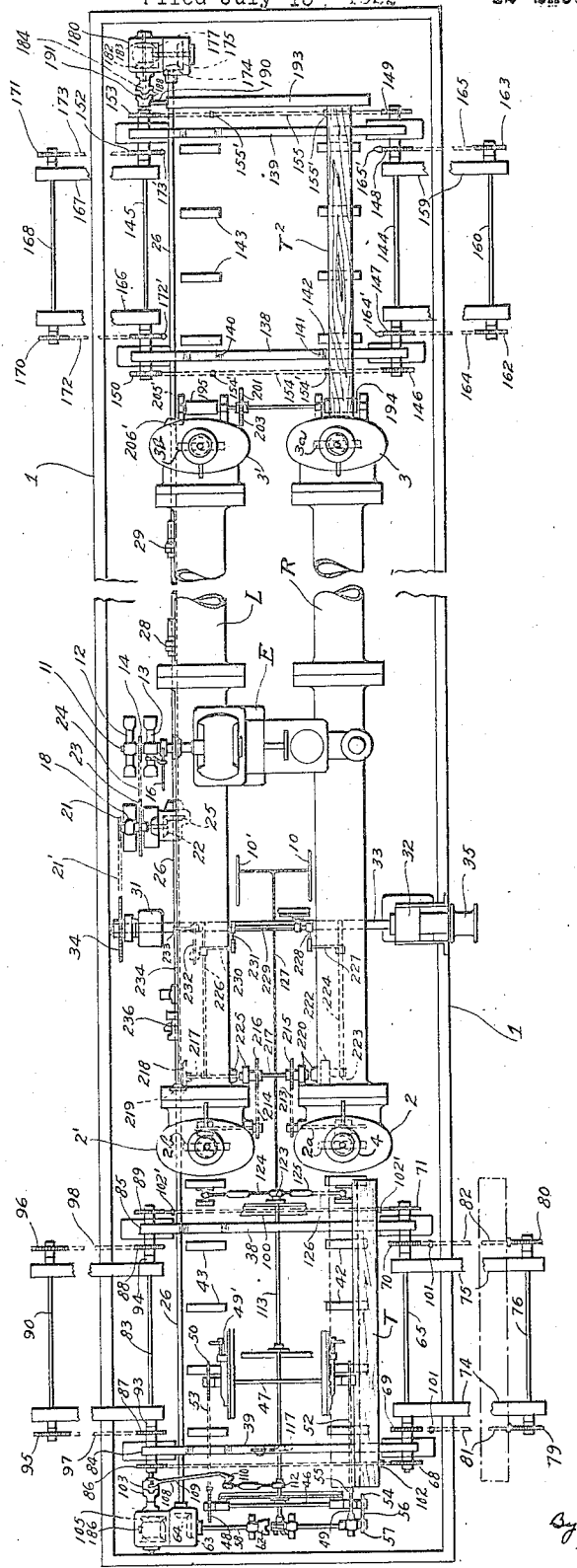

Dec. 18, 1923.

G. B. SHIPLEY ET AL 1,478,259

AUTOMATIC CHARGING AND DISCHARGING APPARATUS FOR WOOD TREATING PLANTS

Filed July 13, 1922      12 Sheets-Sheet 6

WITNESSES

INVENTORS
Grant B. Shipley
and
Jack B. Shipley
By Winter & Brown
ATTORNEYS

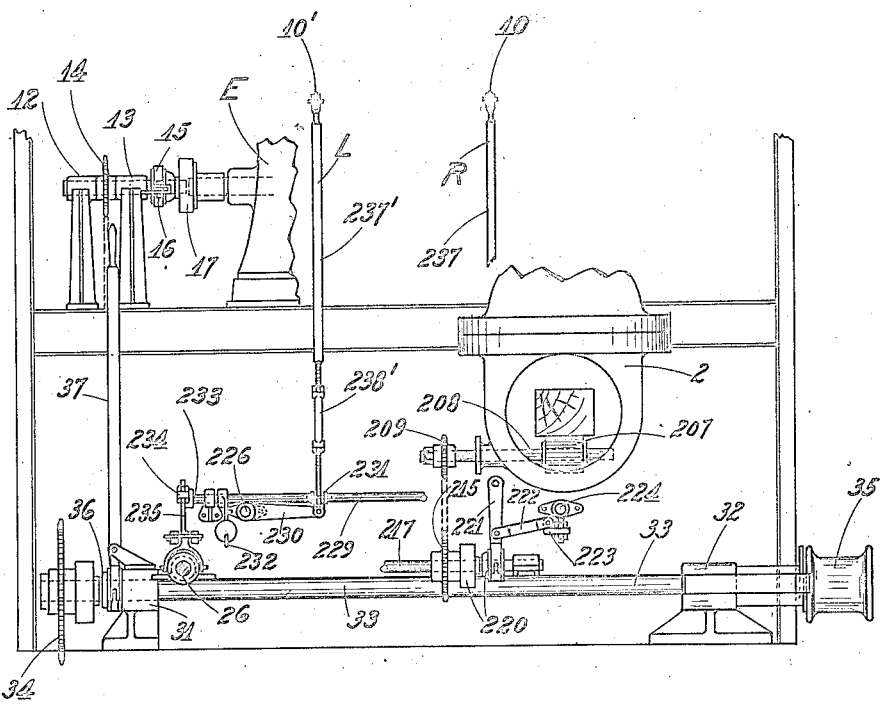

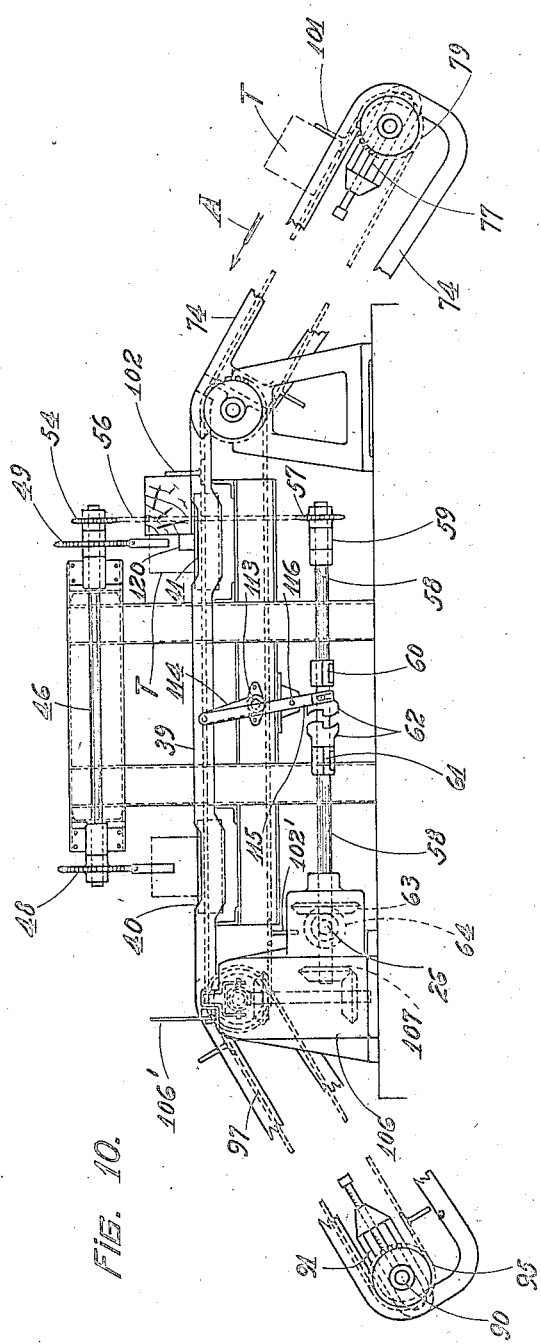

Dec. 18, 1923. 1,478,259
G. B. SHIPLEY ET AL
AUTOMATIC CHARGING AND DISCHARGING APPARATUS FOR WOOD TREATING PLANTS
Filed July 13, 1922    12 Sheets-Sheet 9

WITNESSES
INVENTORS
ATTORNEYS

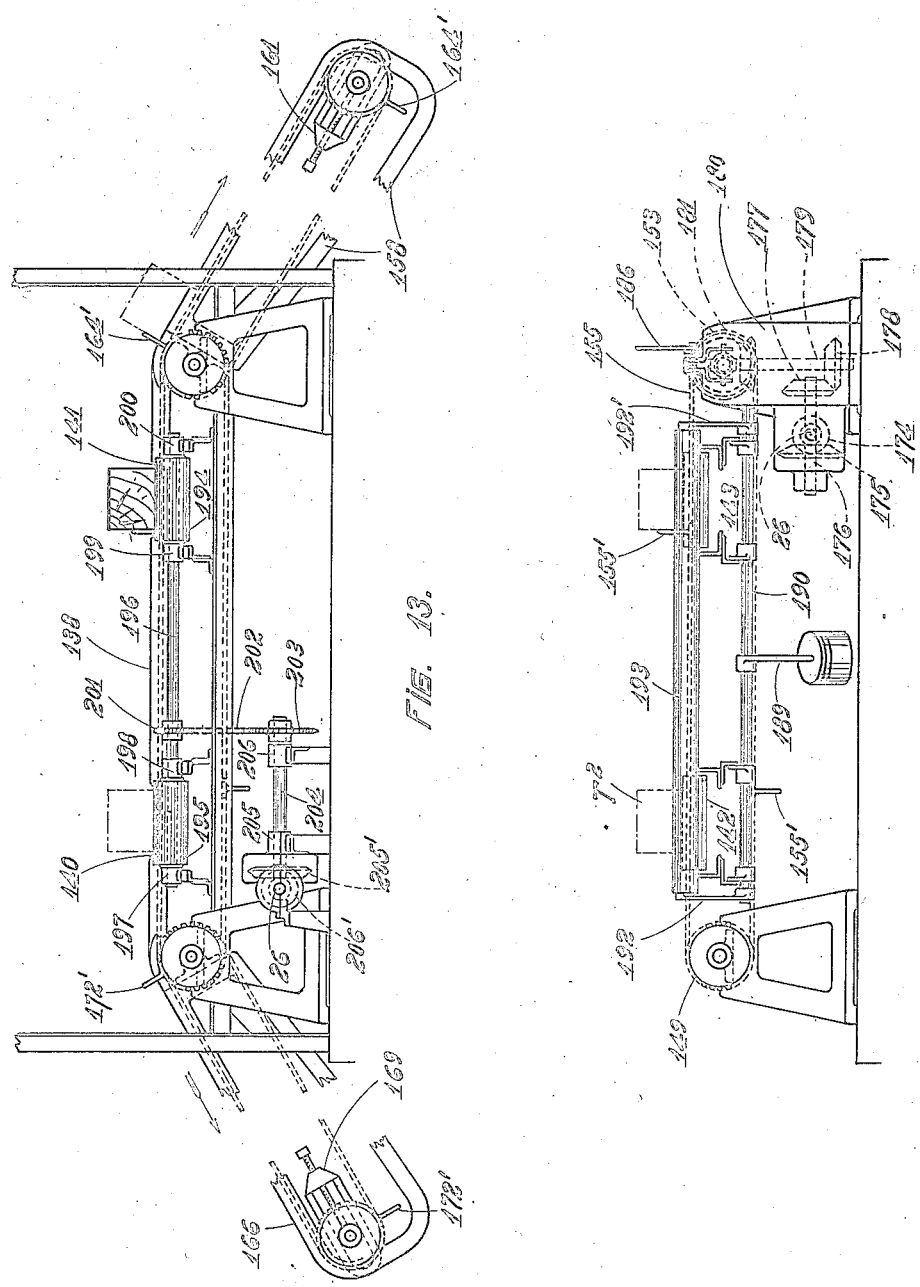

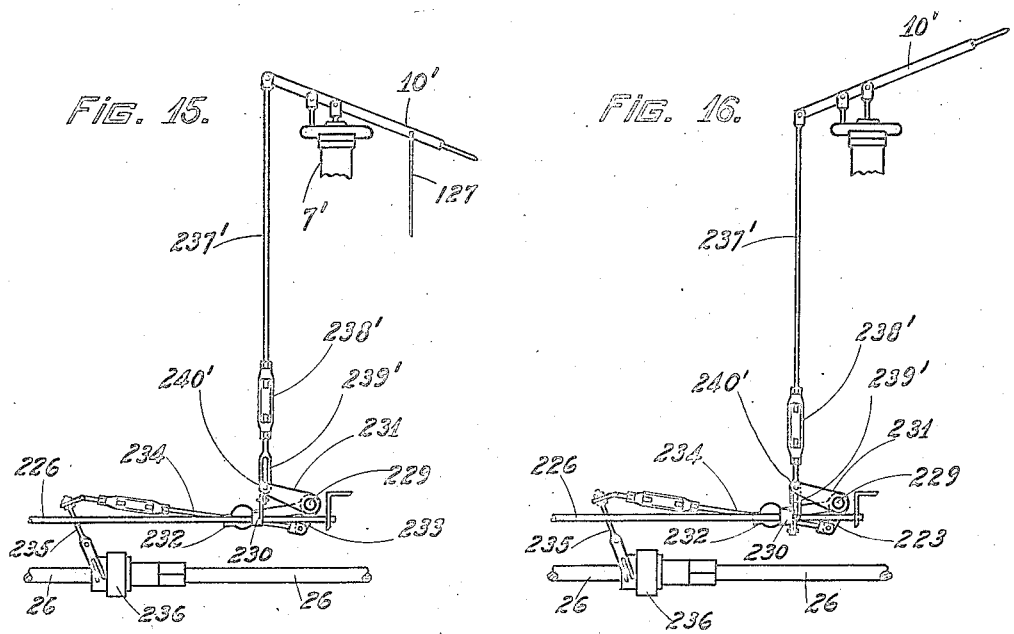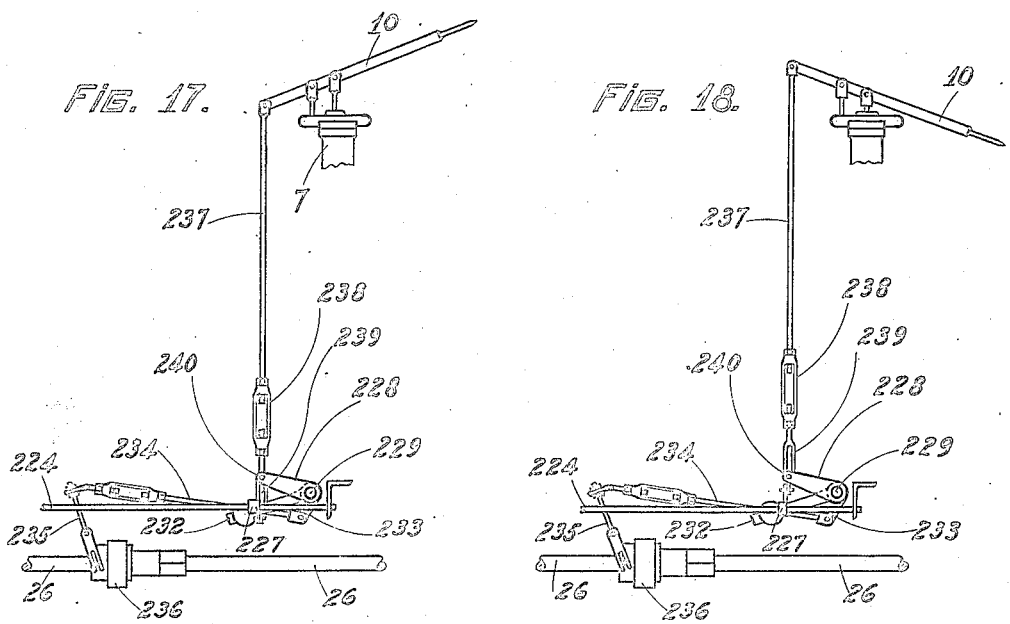

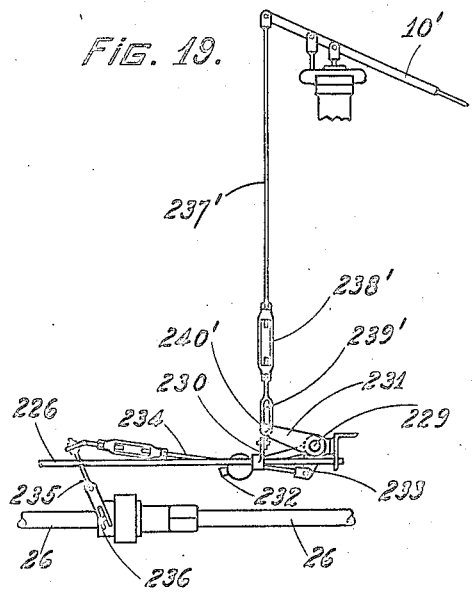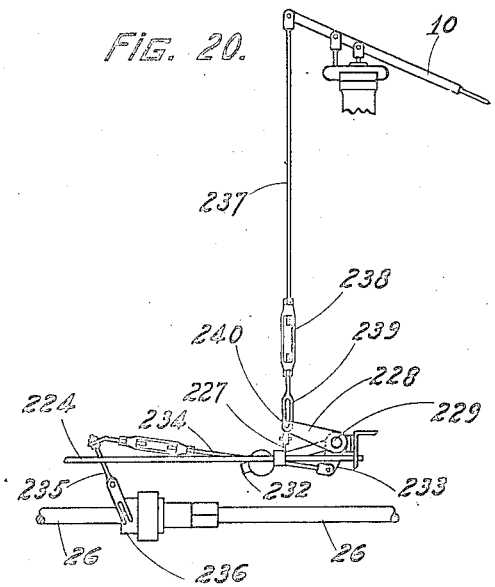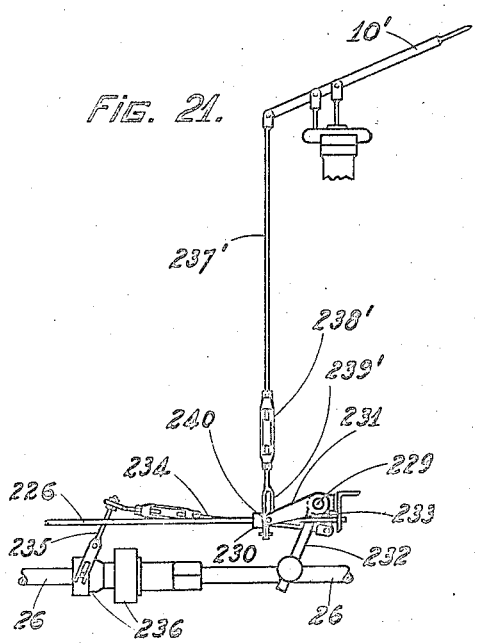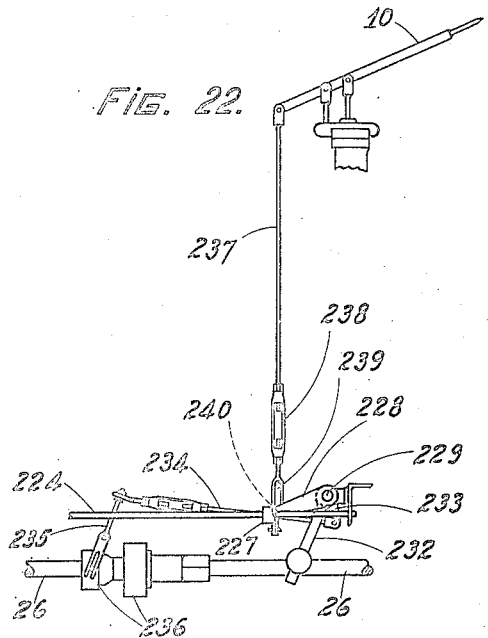

Patented Dec. 18, 1923.

1,478,259

UNITED STATES PATENT OFFICE.

GRANT B. SHIPLEY AND JACK B. SHIPLEY, OF PITTSBURGH, PENNSYLVANIA.

AUTOMATIC CHARGING AND DISCHARGING APPARATUS FOR WOOD-TREATING PLANTS.

Application filed July 13, 1922. Serial No. 574,831.

*To all whom it may concern:*

Be it known that we, GRANT B. SHIPLEY and JACK B. SHIPLEY, citizens of the United States, and residents of Pittsburgh, in the county of Allegheny and State of Pennsylvania, have invented a new and useful Improvement in Automatic Charging and Discharging Apparatus for Wood-Treating Plants, of which the following is a specification.

This invention relates to a charging and discharging apparatus for wood-treating plants, and particularly to such an apparatus which is automatic and adapted especially to the requirements of a portable treating plant mounted upon an ordinary railway car.

It is an object of the invention to provide an apparatus for charging and discharging the material to be treated which will automatically feed the said articles, such as railroad ties, one by one, into the charging ends of the treating cylinders, and in like manner remove the articles after treatment from the discharging ends thereof.

It is a special object to provide an auto-, matically charging and discharging apparatus comprising longitudinally feeding and transversely discharging conveyors disposed adjacent the opposite ends of the treating cylinders and lateral transversely moving conveyors at either side of the said first named conveyors so as to enable the treated material to be fed or discharged from either side of the car upon which the treating plant is mounted.

It is also a special object to so combine the transversely feeding and the longitudinally feeding conveyors at the charging end that movement of the material into alignment with the treating cylinders by the transversely feeding conveyors will set the longitudinally feeding conveyor into operation to feed the same into the cylinder. It is likewise a special object to so combine the conveyors at the discharge end of the treating cylinders that longitudinal movement of the material ejected from the treating cylinders will bring into play the transversely discharging conveyors to remove the treated articles to either side of the car.

It is a further special object to provide an apparatus whereby the material may be selectively fed to either of the pair of treating cylinders employed, and in which the shutting of the closure doors of one treating cylinder will automatically set the mechanism to feed the material into the remaining treating cylinder.

It is still a further special object to provide an apparatus whereby the shutting of the closure doors on both treating cylinders will disconnect the driving power from the several conveyors but will automatically connect the same upon opening of the closure doors of either cylinder.

Other special objects of the invention are to so associate the several parts that the entire mechanism will be compact, convenient to operate, readily adjustable for use or storage, and to provide an apparatus which is universal in its method of handling the material, which is substantially fool-proof, and in which the several live rollers used in connection with the treating cylinders as well as the conveyors proper will be automatically thrown into and out of operation due to the movement of the valve mechanism for the actuation of the closure doors for the treating cylinders, and in which the feeding and discharging of the material to either side of the plant may be changed at will without reversing the direction of the main power source.

Figure 2:
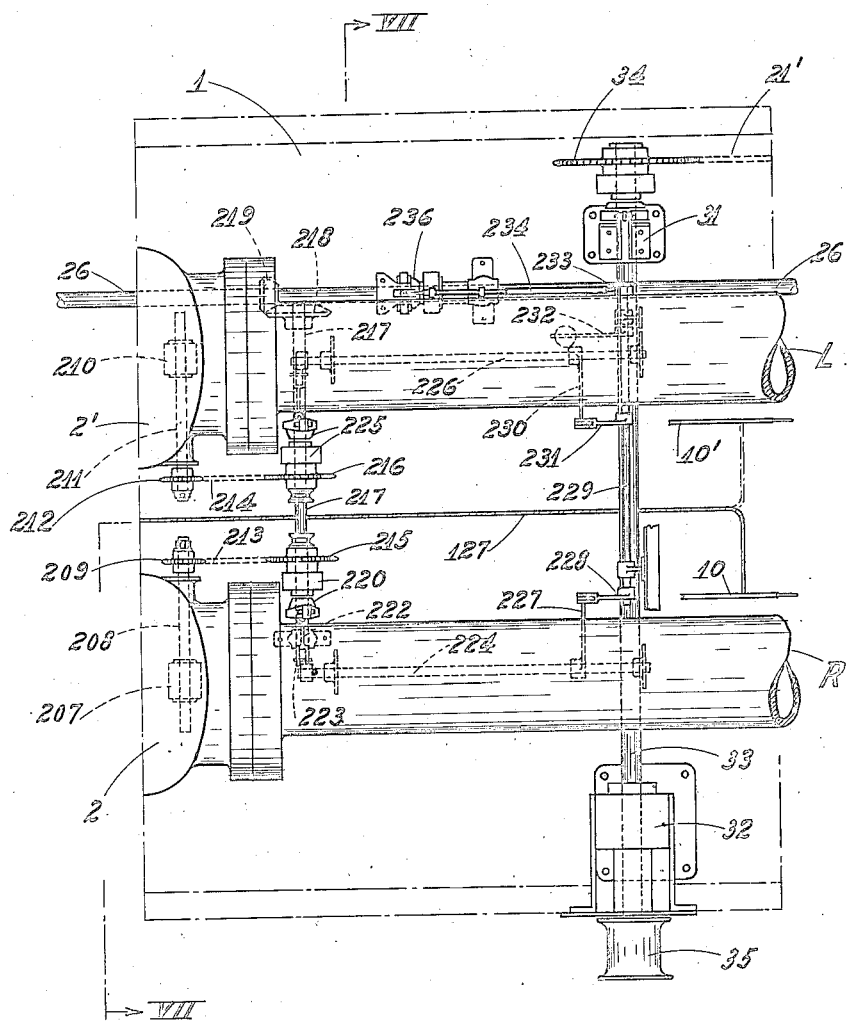
Figure 3:
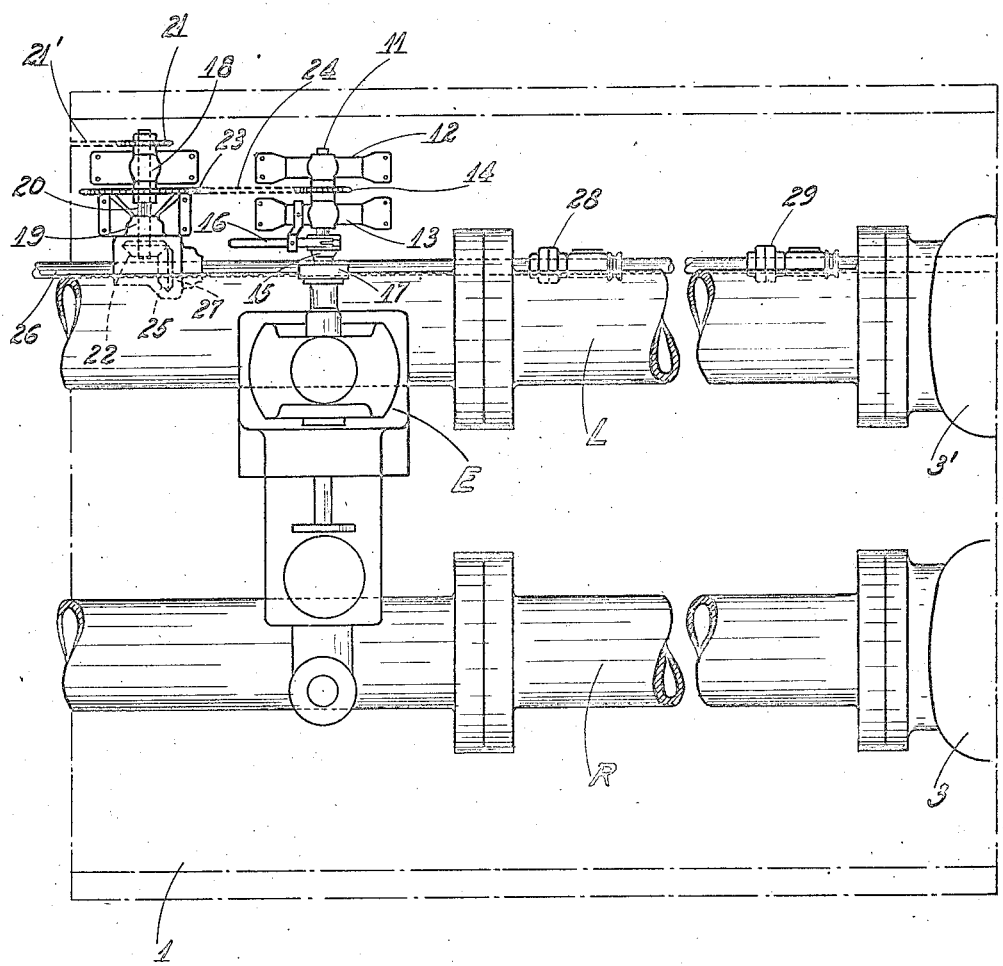
Figure 4:
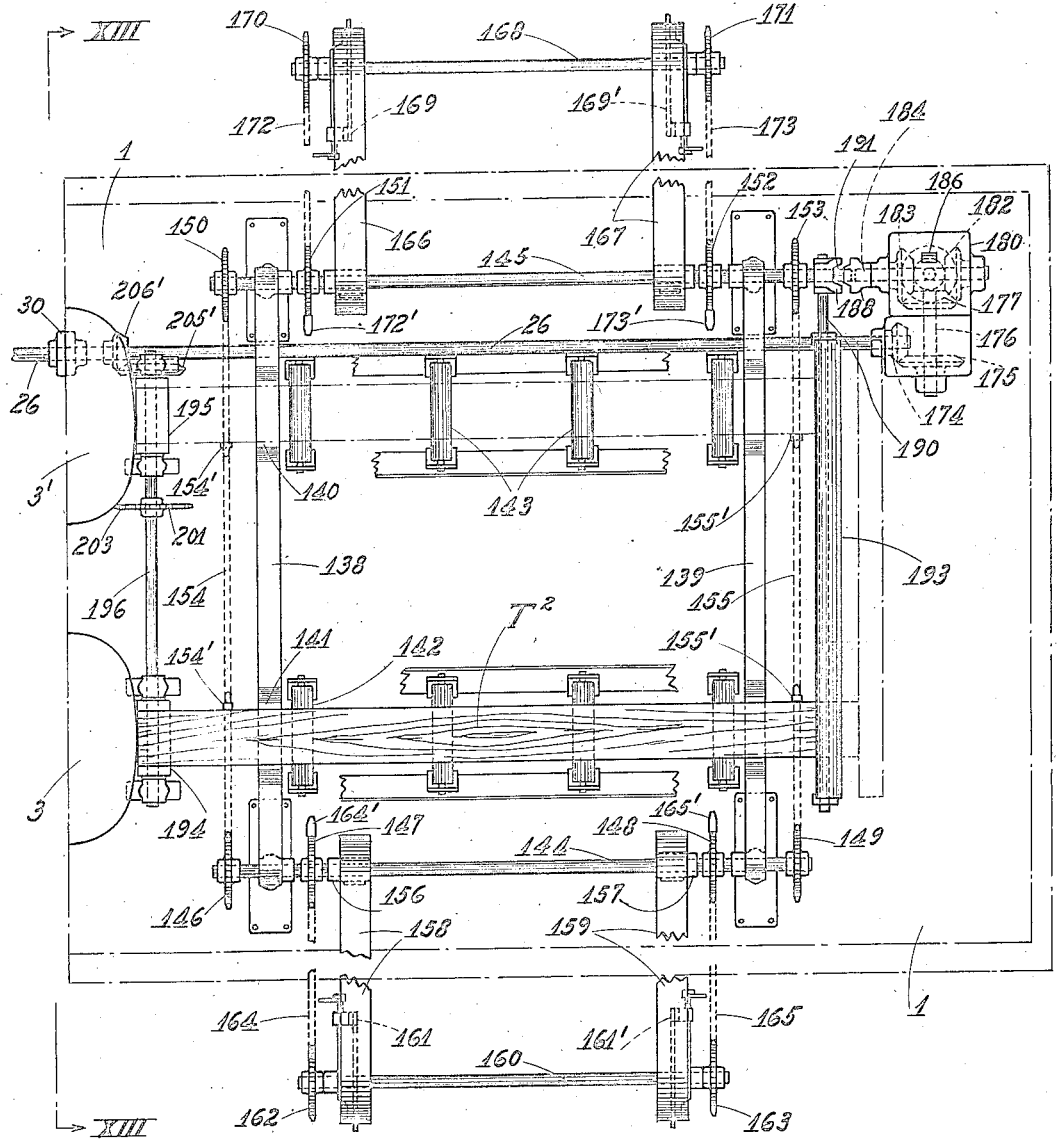
Figure 5:
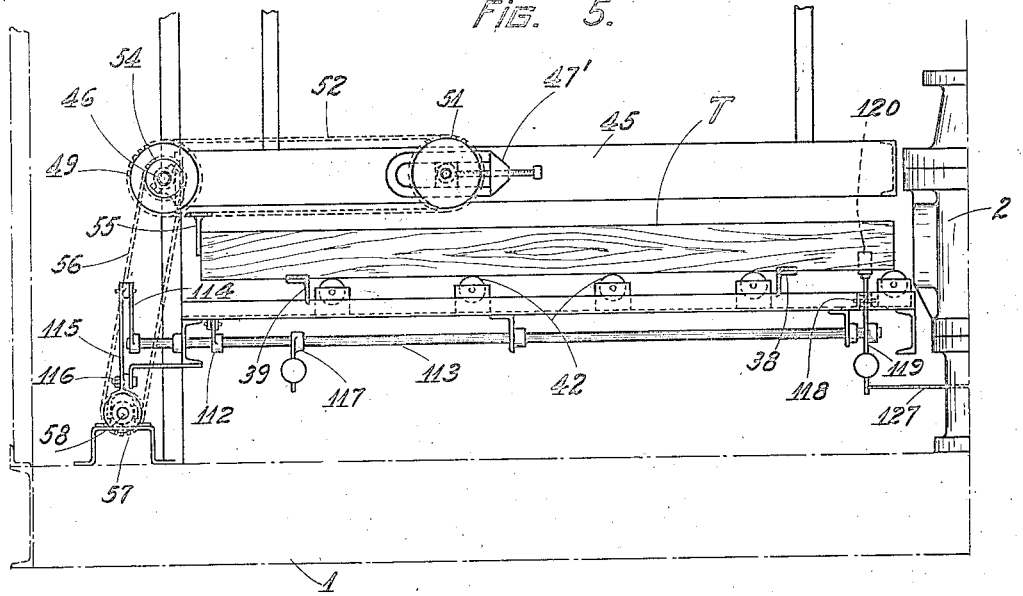
Figure 6:
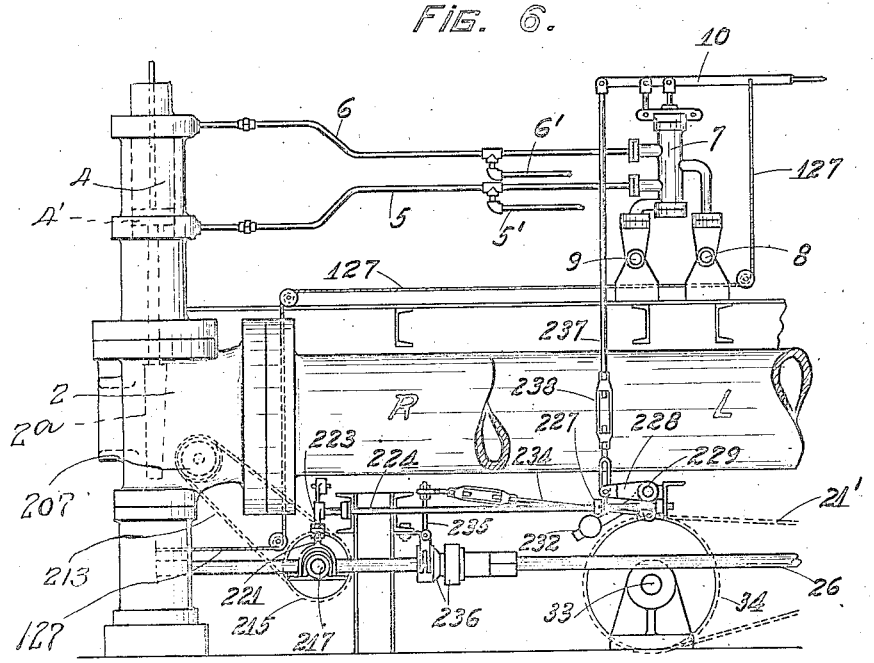
Figure 11:
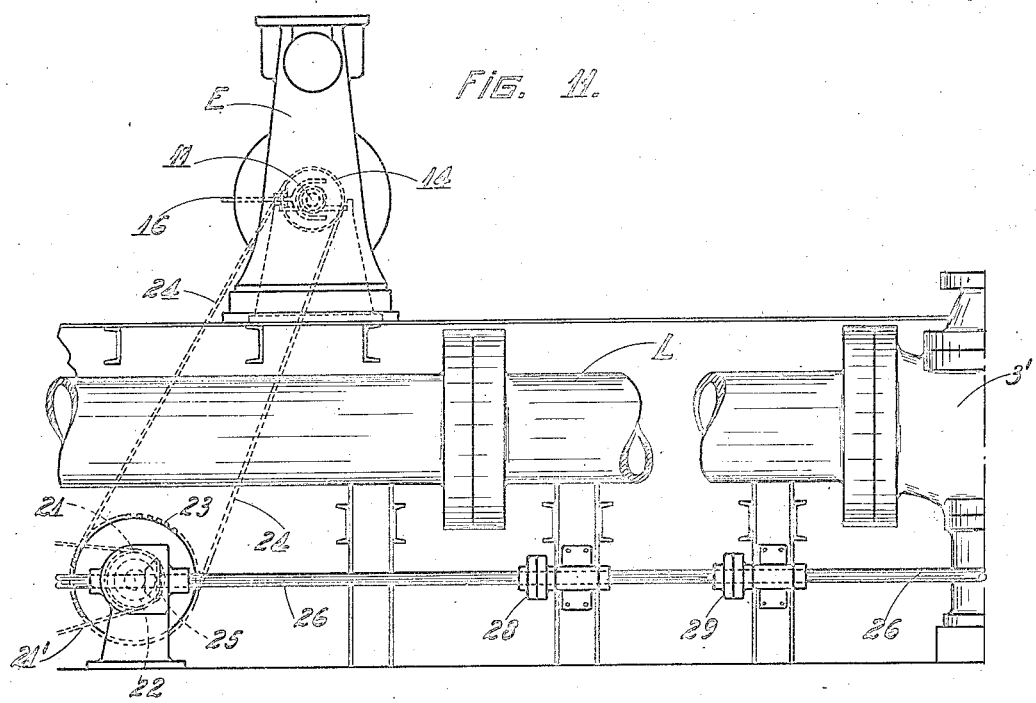
Figure 12:
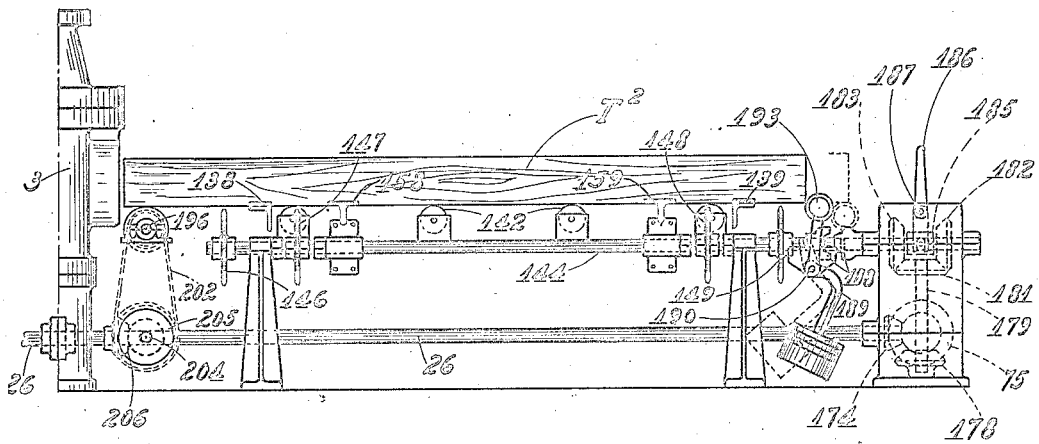

In the accompanying drawings, which illustrate the preferred embodiment of the invention. Fig. 1ª is a diagrammatic plan view of the treating cylinders together with the conveying and feeding devices employed in connection therewith; Fig. 1 is a plan view of the feeding mechanism disposed adjacent the charging end of the treating cylinders; Fig. 2 a fragmentary plan view of the charging end of the treating cylinders; Fig. 3 a view similar to Fig. 2 of the intermediate and discharging portions of the treating cylinders; Fig. 4 a plan view of the discharging conveyors disposed adjacent the discharging ends of the treating cylinders; Fig. 5 a vertical sectional view taken on the line V—V of Fig. 1; Fig. 6 a fragmentary vertical sectional view, with parts broken away, illustrating the connections between the valve device for the closure doors, the main drive shaft, and the operating mechanism for the live roller disposed within the inlet end of the treating cylinder; Fig. 7 a transverse vertical sectional view, with parts broken away, taken on the line VII—VII of Fig. 2; Fig. 8 a transverse vertical sectional view taken through the charging mechanism at the inlet end of the treating cylinder illustrating the relative arrangement of parts when feeding the material from one side of the plant; Fig. 9 a view similar to Fig. 8 showing the arrangement of the parts for feeding the material from the opposite side of the plant; Fig. 10 an end elevation of the charging mechanism looking towards the treating cylinders; Fig. 11 a side elevation of the portions illustrated in Fig. 3; Fig. 12 a side elevation of a portion of the discharging mechanism adjacent the outlet end of the cylinders; Fig. 13 an elevational view of the discharging conveyors looking in the direction of the arrows XIII—XIII of Fig. 4; Fig. 14 an end elevation of the central section of the discharging conveyor together with the reversing mechanism used in connection therewith; and Figs. 15 to 22 are fragmentary detail elevational views illustrating the various positions assumed by the parts upon actuation of the valve mechanism for the closure doors of the treating cylinders.

This invention relates particularly to a charging and discharging apparatus for use in connection with a portable wood-treating plant mounted upon an ordinary flat-topped railway truck of sufficient length for the purpose, and has therefore been illustrated as embodied in a portable plant. It is obvious, however, that the apparatus may be used for charging and discharging material to the treating cylinders of a stationary plant, in which case the several parts will be mounted upon suitable foundations instead of upon the top of a car body.

Due to the fact that it has been necessary to use a number of fragmentary views in order to illustrate the invention, in order to clarify the showing in the drawings, a number of cross beams, braces, and other similar supporting means, all of which are of conventional form, have been omitted therefrom. For the same reason, detailed illustration of the means for supporting the top of the car body have been omitted from the drawings.

The entire apparatus consists of a pair of spaced-apart treating cylinders extending longitudinally of the car body, each of the treating cylinders being provided with the usual closure doors in the form of pressure operated gate valves disposed at both its charging or inlet and discharging or outlet ends, together with specially designed charging conveyors disposed adjacent the charging end of the treating cylinders, a discharging conveyor located close to the discharging ends of the cylinders, and a suitable power source operatively connected to the several conveyors for operating the same.

In the drawings, 1 designates the top of the car body upon which the treating cylinders and the entire conveying mechanism used in connection therewith are mounted. The treating cylinders R and L are spaced apart and extend longitudinally of the body 1, the cylinder R being equipped with the usual charging or inlet head 2 equipped with the usual closure door or gate valve 2', and the discharging or outlet head 3 likewise equipped with the closure door or gate valve 3', while the treating cylinder L is similarly equipped with the inlet 2' and outlet 3' having closure doors 2ᵇ and 3ᵇ, respectively. The inlet head 2 is closed by means of the said gate valve 2ᵃ, the operating cylinder of which is indicated at 4, to the opposite ends of which pressure fluid is admitted and discharged through the conduits 5 and 6 leading from the cylinder of the control valve 7. Branch pipes 5' and 6' extend from the conduits 5 and 6 for conveying pressure fluid to and from the actuating cylinder connected with the closure door or gate valve disposed at the discharging end of the cylinder. Pressure fluid is conveyed to the valve 7 through supply pipe 8 and escapes therefrom through the waste pipe 9, the pressure fluid being admitted either above or below the piston 4' within cylinder 4 by actuating the control lever 10 to either of its extreme positions indicated by the dotted lines in Fig. 6.

Power is supplied by means of an engine E suitably supported at one side of the car, the main shaft 11 of which is suitably journalled in bearings 12 and 13, having a sprocket wheel 14 fixed thereto between said bearings. In order to connect and disconnect the engine from the shaft 11 a clutch 15 adapted to be actuated by the hand lever 16 is interposed therein, a safety friction clutch 17 being also interposed in shaft 11 being located adjacent the clutch 15. Journalled in suitable bearings 18 and 19 is a shaft 20 having the sprocket wheel 21 fixed to one end thereof and the bevel pinion 22 attached to its opposite end, having a second sprocket wheel 23 fixed intermediate its length and disposed between the said bearings, the sprockets 23 and 14 being operatively connected by means of a sprocket chain 24. The bevel gear 22 meshes with a corresponding bevel gear 25 fixed to the main driving shaft 26, which extends substantially the entire length of the car body adjacent the treating cylinder L. In order to protect the gearing 22—25, a suitable housing 27 is provided, and on account of the length of the main driving shaft it is supported at intervals by suitable bearings and composed of several sections operatively connected by flexible couplings such as indicated at 28, 29 and 30, or clutches presently to be described.

Journalled in suitable bearings 31 and 32, and extending transversely of the car body is a shaft 33 having a sprocket gear 34 attached to one end and a capstan drum 35 fixed at its opposite end, a clutch 36 adapted to be actuated by the hand lever 37 being interposed therein. The capstan drum 35 may therefore be rotated at will, by engaging and disengaging the clutch 36, and is used for the purpose of moving the car along the track by twining one end of a cable around the drum 35 and attaching the free end of the cable to some fixed object adjacent the track. Shaft 33 is driven by means of a sprocket chain 21' which extends between the sprocket wheels 21 and 34.

Located adjacent the charging ends of the cylinders is a pair of spaced stationary skids 38 and 39, each of these skids being depressed at points intermediate their ends as indicated at 40 and 41, Fig. 10, such points being in alignment with the treating cylinders. Suitably mounted upon the car body and immediately below the depressed portions of the skids are a series of supporting rollers indicated respectively at 42 and 43, the rollers 42 being in alignment with the cylinder R and the rollers 43 in alignment with the cylinder L, the upper edges of these rollers extending slightly above the depressed portions of the skids.

Supported above the skids 38 and 39 is a longitudinally feeding charging conveyor, the side frame members of which are indicated at 44 and 45. Suitably journalled and extending transversely of these side members are the conveyor shafts 46 and 47, the shaft 47 being adjustable so as to space it at varying distances from the shaft 46 by means of take-up devices 47' of a well known type. Keyed to the opposite ends of shaft 46 are the sprocket wheels 48 and 49, and similarly keyed to the opposite ends of shaft 47 are the sprocket wheels 50 and 51. An endless conveyor chain 52 extends between the sprockets 49 and 51 and a similar conveyor chain 53 extends between the sprockets 48 and 50, said chains being adapted to be tightened by actuating the take-up devices 47' in an obvious manner. Also keyed to the shaft 46 at its extreme outer end and adjacent the sprocket 49 is another sprocket wheel 54. Attached to the chains 52 and 53 are suitable angle contact conveyor lugs 55 which are adapted to contact the ends of the ties to be fed into the treating cylinder in a manner to be presently described.

The shaft 46 and consequently the entire longitudinally feeding charging conveyor is driven by means of a sprocket chain 56 which connects the sprocket wheel 54 and sprocket wheel 57 at one end of a transverse shaft 58 suitably journalled in bearings 59, 60 and 61, a clutch 62 connecting the sections of said shaft. The shaft 58 is in turn driven by means of the bevel pinions 63 and 64 attached to the shaft 58 and main driving shaft 26 respectively.

Located at one side of the car body and opposite the skids and longitudinally feeding conveyor is a shaft 65 suitably journalled in bearings 66 and 67, said shaft having fixed thereto the sprocket wheels 68, 69, 70 and 71. Pivotally mounted at 72 and 73 upon the shaft 65 are the side members 74 and 75 forming ladder skids of a lateral section of a transversely feeding chamber conveyor including the adjustable shaft 76 supported at the outer extremities of the members 74 and 75, the shaft 76 being adjustable by means of the take-up devices 77 and 78 in a manner similar to that described in connection with the shaft 47. Fixed to the opposite ends of shaft 76 are sprocket wheels 79 and 80, a sprocket conveyor chain 81 extending between the sprocket wheels 69 and 79, while a similar sprocket conveyor chain 82 extends between the sprocket wheels 70 and 80. Located at the opposite side of the car body, and also in alignment with the skids 38 and 39, is a shaft 83 suitably journalled in bearings 84 and 85. Shaft 83 has fixed thereto the sprocket wheels 86, 87, 88 and 89, and forms the inner shaft of another lateral section of a transversely feeding charging conveyor, the outwardly disposed shaft of which is indicated at 90 which is journalled in the side members 91 and 92 pivoted upon the shaft 83 at 93 and 94 respectively, and forming ladder skids as pointed out in connection with the members 74 and 75. Fixed to the opposite ends of shafts 90 are the sprocket wheels 95 and 96, the former of which is connected to the sprocket wheel 87 by means of conveyor chain 97 and the latter of which is similarly connected to the sprocket wheel 88 by means of conveyor chain 98. Sprocket wheels 68 and 86 are operatively connected by means of conveyor chain 99, and sprocket wheel 71 is connected to sprocket wheel 89 in like manner by means of the conveyor chain 100. Attached to the chains 81 and 82 are the conveying lugs 101, the chains 97 and 98 being also equipped with similar lugs. For the purpose of moving the ties or other suitable material transversely of the skids 38 and 39, the sprocket chains 99 and 100 have attached thereto at suitable points the conveying lugs 102 and 102'. It is thus seen that the chains 99 and 100 form the main central section of the entire transversely feeding charging conveyor, while the chains 81, 82 and 97, 98 form two auxiliary lateral sections of said conveyor for feeding the material onto the skids 38 and 39 into position to be contacted by the conveying lugs 102, 102' of the main central section, and due to the connections between the several sections all are driven from shaft 83 adapted to be engaged and disengaged through clutch 103 with the main drive shaft 26.

Splined upon one extremity of shaft 83 is the movable member of a clutch 103 the fixed portion of which is attached to the outer end of a stub shaft 104 carrying a bevel pinion 105 which is driven through the reverse gear mechanism represented generally at 106 by means of pinion 107 attached at one end of shaft 58, the said mechanism being controlled by the hand lever 106'. The reverse gear mechanism is of a conventional type and identical with that used at the discharging end of the apparatus which will be subsequently described in greater detail. The clutch 103 is adapted to be actuated by means of lever 108 pivoted at 109 and is operatively connected through the bell crank lever 110 and link 111 to a rock shaft 113 suitably journalled below the stationary skids. Attached to one extremity of shaft 113 is a crank arm 114 which is operatively connected to the movable member of the clutch 62 by means of the lever 115 pivoted at 116, and for the purpose of constantly urging the shaft 113 in one direction in order to engage clutch 103 and disengage the clutch 62 a weighted lever 117 is also attached thereto.

Suitably pivoted as at 118 is a weighted lever 119 disposed in alignment with the axis of the treating cylinder R, the upper end 120 of the said lever extending above the rollers 42 and the skids 38, 39 so as to be contacted by the tie T as the same is brought into alignment with the treating cylinder by the transversely feeding charging conveyor mechanism. Similarly mounted and disposed in alignment with the treating cylinder L is a corresponding weighted lever 121 the upper end 122 of which extends above the conveying rollers 43 and the skids 38, 39. Fixed to the end of shaft 113 opposite the crank arm 114 is a rocking beam 123. A link 124 connects one extremity of the rocking beam to the weighted lever 121 and another link 125 connects the corresponding end of the rocking beam with the weighted lever 119. As illustrated in Fig. 9, the link 124 is rigid while the link 125 is a flexible one, being rendered so by means of the interposed cable section 126. The arrangement illustrated in Fig. 9 is such as to render the parts operative in the desired manner when feeding ties from one side of the apparatus. Should it be desired to feed the ties from the opposite side, the links 124 and 125 are transposed to the opposite sides of the shaft 113 and are pivotally attached to the lower arm of the rocking beam 123 instead of its upper arm. This reversed arrangement is clearly indicated in Fig. 8 in which figure the rigid link is designated 124' and the flexible link and interposed cable section as 125', 126' respectively. Attached to the extreme lower portion of the weighted lever 119 or 121 is one end of a cable 127 the opposite end of which is attached to the control lever or handle 10 or 10' of the valve mechanism for moving the closure doors of the treating cylinders, said cable being retained in position and suitably guided by appropriate sheaves disposed at convenient points of the apparatus. The weighted levers 119 and 121 normally hang in a vertical plane as shown by the full lines in Figs. 8 and 9. Due to the connections between these weighted levers and the shaft 113, also due to the action of the weighted lever 117, the shaft 113 is urged to rotate in the direction to maintain the clutch 103 in engagement and to keep the clutch 62 disengaged.

Disposed adjacent the discharging or outlet ends of the treating cylinders are transversely extending stationary skids 138 and 139 which are similar to the skids 38 and 39 at the inlet ends thereof. The skids 138 and 139 are also provided with depressed portions indicated at 140 and 141 in alignment with the treating cylinders, and suitably supported immediately below the depressed portions are series of supporting rollers 142, 143 corresponding to the series of rollers 42 and 43 at the charging end. Journalled in suitable bearings disposed adjacent the opposite sides of the skids are shafts 144 and 145, the former having fixed thereto the sprocket wheels 146, 147, 148 and 149, and attached to the latter are the sprocket wheels 150 and 153. Operatively connecting the wheels 146, 150 and wheels 149, 153 are the respective conveyor chains 154 and 155. The chain 154 carries suitably spaced conveying lugs 154' and chain 155 likewise carries conveying lugs 155'.

Pivoted to the shaft 144 at 156 and 157 are the respective side members 158 and 159 forming ladder skids of an auxiliary lateral discharging conveyor section, a shaft 160 being journalled in the outer extremity of the side members which is rendered adjustable so as to vary its distance from the shaft 144 and to tighten its conveyor chains by means of take-up devices indicated at 161 and 161'. The opposite extremities of shaft 160 carry sprocket wheels 162 and 163, a conveyor chain 164 operatively connecting wheel 162 with the sprocket wheel 147, and a similar conveyor chain 165 connecting wheels 163 and 148. A similar lateral auxiliary discharging conveyor section is pivotally mounted for swinging movement upon the shaft 145 consisting of the side members or ladder skids 166, 167, the adjustable shaft 168 and take-up devices 169, 169', the opposite ends of shaft 168 having fixed thereto the sprocket wheels 170 and 171. A conveyor chain 172 operatively connects the wheels 151 and 170 and a similar conveyor chain 173 connects the wheels 152 and 171. The chains 164, 165, 172 and 173 are fitted with suitable conveyor lugs 164', 165', 172' and 173', respectively. It is thus seen that the shafts 144, 145 together with their sprocket wheels and chains 154, 155 comprise a main central section of a transversely feeding discharging conveyor, while the shaft 160 and chains 164, 165 forms a laterally adjustable swinging section thereof disposed at one side of the central section, the shaft 168 and chains 172, 173 forming a corresponding laterally adjustable swinging section located at its opposite side.

The entire discharging conveyor mechanism is driven by the main driving shaft 26 which is operatively connected to shaft 145. The extremity of shaft 26 carries a pinion 174 which meshes with a bevel pinion 175 fixed to a short shaft 176 carrying the pinion 177 at its opposite end. Pinion 177 meshes with a corresponding pinion 178 fixed to the lower end of a shaft 179 of the reverse gear mechanism 180, the shaft 179 having attached to its upper extremity another bevel pinion 181 similar to pinion 178. Pinion 181 in turn meshes with two pinions 182 and 183 which are loosely mounted upon the shaft 184 of the reverse gear mechanism. Splined to the shaft 184 and disposed between the pinions 182 and 183 is a clutch collar 185 adapted to selectively engage either of said pinions to rotate the shaft 184 in either direction, the collar 185 being adapted to be moved by the actuating handle 186, suitably pivoted as at 187 to the reverse gear housing. The fixed member of a clutch device 188 is fixed to the extremity of shaft 184, the movable member of the clutch being mounted upon the adjacent end of the shaft 145. The clutch 188 is normally held out of engagement by means of a weighted lever 189 attached to a rocking shaft 190 mounted in any suitable manner below the skids 138 and 139, a crank arm 191 extending from said shaft being operatively connected to the movable member of the clutch. Crank arms 192 and 192' project upwardly from the shaft 190, the upper extremities of which are connected by the transverse bar 193 the several parts forming a kick-in lever adapted to cause engagement of the clutch 188 when contacted by the ties ejected from the treating cylinders, the transverse bar 193 normally extending above the upper surface of the skids 138, 139 and directly in the path of the treated ties when discharged onto the skids in position to be acted upon by the transversely moving discharging conveyor.

Disposed adjacent the outlet 3 of the cylinder R and in alignment therewith is a live roller 194, the upper surface of which lies in substantially the same horizontal plane as the upper surfaces of the rollers 142, a similar live roller 195 being disposed adjacent the discharge end 3' of the treating cylinder L. Both these rollers are fixed to a shaft 196 suitably supported in bearings 197 to 200, the shaft 196 having attached to its intermediate portion a sprocket wheel 201 which is driven by means of a sprocket chain 202 operatively connecting wheel 201 to a sprocket wheel 203 fixed to the extremity of a shaft 204 disposed below the skids and suitably mounted in bearings 205, 206. The end of the shaft 204 opposite the sprocket wheel 203 carries a pinion 205 meshing with a pinion 206' fixed to the main driving shaft 26, as clearly shown in Fig. 13.

Disposed within the inlet head 2 of the treating cylinder R is a live roller 207 fixed to a shaft 208 suitably journalled in the said head and extending at one end to the exterior thereof, said end having fixed thereto the sprocket wheel 209. The inlet head 2' of cylinder L is likewise provided with a live roller 210 fixed to shaft 211 carrying the sprocket wheel 212 at its extremity. The wheels 209 and 212 are driven by sprocket chains 213 and 214 operatively engaging the respective sprocket wheels 215 and 216 loosely mounted upon the transverse shaft 217. Shaft 217 has fixed at one end the pinion 218 which meshes with a pinion 219 fixed to the main driving shaft 26 so as to constantly rotate the same. The sprocket wheel 215 is operatively engaged and disengaged with the shaft 217 by means of a clutch 220 adapted to be actuated by means of a lever 221 connected through link 222 to a crank arm 223 projecting from a rocking shaft 224. The sprocket wheel 216 is likewise adapted to be operatively connected and disconnected from the shaft 217 by means of a clutch device 225 similar to clutch 220 which is in turn connected to the rocking shaft 226 through a corresponding link and crank arm. The rocking shaft 224 has attached thereto adjacent its extremity remote from the crank arm 223 another crank arm 227 which is pivotally connected to a crank arm 228 projecting from the transversely extending rocking shaft 229. The rocking shaft 226 also carries a crank arm 230 adjacent its end remote from the shaft 217 which is operatively connected to a second crank arm 231 fixed to the transverse rocking shaft 229. The shaft 229 is normally urged to rotate in one direction by means of a weighted lever 232 attached thereto. Fixed to the extremity of the shaft 229 is a lever arm 233 having pivotally attached thereto the link 234 in turn pivotally connected at its opposite end to a swinging lever 235 adapted to actuate a clutch 236 interposed between sections of the main driving shaft 26.

Each of the treating cylinders is provided with a valve mechanism for actuating the closure doors thereof, the pressure cylinder of such valve mechanism used in connection with the cylinder R being indicated at 7 and controlled by means of the control lever or handle 10 as previously described. Since the valve actuating mechanism for the two treating cylinders are identical in construction, only one thereof need be described in detail. The pressure cylinder for the valve mechanism used in connection with treating cylinder L is indicated at 7' and is adapted to be controlled by the actuating handle 10' as shown in Fig. 15.

Movement of the handle 10 also controls the engagement and disengagement of the clutch 220 for throwing the live roller 207 into and out of operation, the extremity of the handle 10 being pivotally connected to the upper end of a link 237 the lower end of which is pivotally connected to the crank arm 227 fixed to the rocking shaft 224. Movement of the actuating handle 10' used in connection with the treating cylinder L in a like manner also controls the engagement and disengagement of the clutch 225, the extremity of the handle 10' being pivotally connected to the upper end of link 237' the lower extremity of which is in turn pivotally connected to the crank arm 230 extending from the rock shaft 226. In order to render the links 237, 237' adjustable in length the same are composed of two sections operatively connected by the respective turn-buckles 238, 238'.

Movement of the actuating handles or control levers 10, 10' also controls the engagement and disengagement of the clutch 236 interposed in the main driving shaft 26, the arrangement between the several parts being such that the clutch 236 is disengaged so as to stop the entire mechanism at the charging end of the treating cylinders whenever the closure doors of both treating cylinders are shut, but will remain engaged as long as the doors of either cylinder remain open, or whenever the closure doors of either or both cylinders are moved to open position. For such purpose the lower section of the link 237 is provided with an elongated slot 239 which cooperates with a pin 240 extending between bifurcated ears at the extremity of the lever arm 228 and passing through the said slot, thus forming a lost motion connection between the link 237 and the rock shaft 229. The link 237 connected to the actuating handle 10' of the treating cylinder L is likewise connected to the lever arm 231 by means of an elongated slot 239' and pin 240' forming a lost motion connection between the actuating handle and rock shaft 229.

Due to the positive connection between the rock shaft 229 through the crank arm 233, link 234, and lever 235 to the clutch 236, whenever the rock shaft 229 is rotated in a clockwise direction, as viewed in Figs. 15 to 22, the said clutch is moved to its closed or engaged position, the clutch being normally disengaged by the tension exercised by the weighted lever 232 which normally urges shaft 229 to rotate in an anti-clockwise direction.

The actuation of the clutch 236 by means of the control levers or handles 10, 10' and the cooperation between the several parts to effect the desired result, as well as the actuation of the clutches 220 and 225 by means of movement of the respective handles 10 and 10', is clearly shown by comparing the several showings in Figs. 15 to 22. Whenever the handle 10 is moved from the position shown in Fig. 20 to that shown in Fig. 17, the valve mechanism for the closure doors will be moved to a position to shut the closure doors of the treating cylinder R. During such movement, as long as the handle 10' is in the position illustrated in Fig. 19, maintaining the closure doors of cylinder L open, the pin 240 merely rides idly from the upper to the lower end of the slot 239 without imparting movement to the rock shaft 229 and consequently uneffecting the clutch 236. Raising of the control lever 10, however, lowers the link 237, causing rock shaft 224 to turn and through crank arm 223, link 222 and lever 221 to disengage the clutch 220 and stop the operation of the live roller 207. Likewise should the handle 10' be moved from the position shown in Fig. 19 to that shown in Fig. 16, lowering of the link 237' will permit the shaft 226 to be rotated to disengage the clutch 225 and stop the live roller 210 but will in no way affect the shaft 229, the pin 240' merely riding idly from the lower extremity to the upper extremity of the slot 239', the weighted lever 232 and the lever arm 231 being maintained in their raised position during such movement of the handle 10' due to engagement of pin 240 with the lower end of the slot 239. It is thus seen that either handle 10 or 10' may be moved from its extreme positions to either open or shut the closure doors of the respective treating cylinders without causing movement of the rock shaft 229 as long as one or other of the actuating handles remains in its raised position. However, whenever both handles 10 and 10' are moved to their raised positions as shown in Figs. 21 and 22, both the lever arms 228 and 231 are free to fall under the influence of the weighted lever 232 rocking the shaft 229 in anti-clockwise direction, consequently moving the elements 233 to 235 to the position shown in said figures and causing the clutch 236 to be disengaged. Disengagement of the clutch 236 disconnects the section of the main driving shaft 26 to the left of said clutch, as viewed in Fig. 2, causing a stoppage of the entire charging conveyor mechanism located at the inlet end of the cylinders. The relative positions assumed by the several parts during movement of the control levers or handles 10 and 10' are clearly illustrated in the drawings, Figs. 19 and 20 illustrating both handles moved to a position to open the closure doors of both cylinders. Figs. 15, 17 and Figs. 16, 18 illustrating the relative positions assumed when the doors of one cylinder are open and the doors of the other cylinder are closed, while Figs. 21, 22 show the position of the parts when the closure doors of both cylinders are closed, clutch 236 being engaged at all times except when the closure doors of both cylinders are moved to their closed position.

During storage of the car upon which the plant is mounted, or whenever the car is moved from place to place, the vertically swinging lateral sections of the transversely feeding conveyor at the charging end, also the vertically swinging lateral sections of the conveyor at the discharging end, are swung upwardly about their respective pivotal connections to the several shafts in order to occupy less room and to avoid projections extending from the side of the car. These lateral conveyor sections may either rest upon other portions of the apparatus, or special supporting means in the nature of suspending cables, not shown, may be employed. Whenever the plant is to be put into operation, the lateral feeding conveyor sections are moved to the positions illustrated in full lines in the drawings, the lower portions of the side members or ladder skids being either propped up by means of blocks, or suspended at the desired angle by means of the cables above referred to.

Power is supplied from the engine E through the several shafts and driving connections to the main drive shaft 26, and the reverse gear mechanisms 106 and 180 are set to move the conveyors at both ends of the apparatus in the desired direction. The reverse gear mechanism 106 is interposed between the main driving shaft and the transversely feeding conveyor mechanism at the charging end, while the reverse gear mechanism 180 is similarly interposed between the main drive shaft and the conveyor mechanism at the discharge end. The charging and discharging conveyors may therefore be selectively moved in either the same or opposite directions so as to feed the material to be treated from either side of the car and remove the material after treatment to either the same or opposite side, as desired.

With the links 124 and 125 connected to the rocking beam 123 and the reverse gear mechanism 106 set to drive the transversely feeding charging conveyors to move the treated material in the direction of the arrow A at the right of Figs. 9 and 10, the operation of the device is as follows: The weighted levers 117, 119, and 121 normally urge the clutch 103 into engagement and disconnects the clutch 62 interposed between the sections of shaft 58. The ties T to be treated are fed upon the ladder skids or side members 74 and 75 of the lateral transversely feeding charging conveyor section and are contacted by the conveyor lugs 101 attached to the conveyor chains 81 and 82, moving the tie upwardly along the said ladder skids and depositing the same upon the transverse stationary skids 38 and 39. After being deposited upon the stationary skids, the conveyor lugs 102 or 102' contact the tie in the manner illustrated in Fig. 10 moving the tie transversely of the skids and into abutting relation with the upwardly projecting portion 120 of the weighted lever 119. Continued movement of the tie forces the weighted lever into the dotted line position 120$^a$ (Fig. 9) depositing the tie upon the rollers 42 and in alignment with the treating cylinder R, in which position the tie is supported entirely by the said rollers due to the depressed position 41' of the skids.

Movement of the tie into this position, as indicated by the dotted lines T', Fig. 10, with the resulting swinging of lever 119, causes shaft 113 to be rocked in a clockwise direction as viewed in said figure, and due to the connections between shaft 113 and the clutches 103 and 62, causes disengagement of the clutch 103 stopping the transversely feeding conveyor, and engages the clutch 62 putting into operation the longitudinally feeding conveyor. The conveyor lugs 55 attached to the conveyor chains 52 and 53 are therefore brought into contact with the end of the tie, as illustrated in Fig. 5, moving the tie into the inlet 2 of the treating cylinder R, the closure doors of which are open due to the positioning of the actuating handle 10 as indicated in Fig. 20, in which instance the clutches 220 and 236 are engaged and the live roller 207 in motion. The live roller 207 aids in feeding the tie into the cylinder R causing the same to move entirely thereinto after the conveying lug 55 has partially fed the tie within the interior of the cylinder. The weighted lever 119, due to the contact of the side of the tie therewith, is maintained in the position 120$^a$ (Fig. 9) until the tie has completely passed the said lever. As soon as contact between the tie and lever 119 is broken, the said lever regains its vertical position causing clutch 103 to be again engaged and clutch 62 disengaged, thus stopping the longitudinally feeding charging conveyor and setting the transversely feeding charging conveyor into operation. Another tie is then fed upwardly along the ladder skids 74, 75 into position to be injected into the treating cylinder which is subsequently fed thereinto in the manner just described. This operation is repeated until the desired quantity of ties have been fed into the cylinder R, that usually are required for a complete charge with ties of standard length being three in number.

After the desired number of ties has been fed into the cylinder R, the actuating handle 10 of the valve mechanism for actuating the closure doors thereof is moved to its raised position, as shown in Fig. 17, shutting the said doors. Movement of the handle 10 to this position causes the clutch 220 to be disengaged, stopping further rotation of the live roller 207, but unaffecting the engagement of the clutch 236, assuming the closure doors of the treating cylinder L to be in their open position. Due to the connection of the cable 127 to the actuating handle 10 and the lower extremity of the weighted lever 119, movement of said handle causes said weighted lever to be moved to the dotted line position indicated at $120^b$ in Fig. 9, and causes the upper end thereof to be depressed below the upper surface of the transverse skids 38 and 39. Movement of the weighted lever 119 to this position does not cause a corresponding movement of the rock shaft 113 due to the lost motion connection between the lever 119 and rocking beam 123 afforded by the flexible link 125—126. Movement of the lever 119 to the position indicated at $120^b$ permits the succeeding tie delivered upon the transverse stationary skids to be moved completely across the same by the conveyor lugs 102, 102′, bringing the tie into contact with the upper extremity 122 of the weighted lever 121 and forcing said lever to the dotted line position $122^a$ at which time the tie is directly in alignment with the treating cylinder L. Movement of the lever 121 to the position $122^a$, due to the connection of the rigid link 124 with the rocking beam 123, causes rocking movement of the shaft 113 in a manner similar to that caused by the movement of the weighted lever 119 to its dotted line position $120^a$, and in turn causes a similar disengagement and engagement of the respective clutches 103 and 62. Engagement of the clutch 62 brings into operation the longitudinally feeding charging conveyor, as previously described, partially feeding the ties into the cylinder L by moving the conveyor lug attached to the conveyor chain 53 into contact therewith. The clutch 225 being in engagement and the live roller 210 in operation, the ties are completely fed into the treating cylinder L. After the desired number of ties has been fed to the cylinder L, the closure doors thereof are shut by moving the actuating handle 10′ to its raised position, as indicated in Fig. 16, simultaneously disconnecting the clutch 225 and stopping rotation of the live roller 210.

During the filling of the treating cylinder L the ties previously fed into the cylinder R are subjected to the usual method of impregnating the same with a preservative, the details of which in no way form a part of the present invention. If the ties within cylinder R have been completely treated and the preservative removed from the cylinder by the time cylinder L has been filled, the actuating handle 10 will be depressed prior to moving actuating handle 10′ to its raised position to shut the closure doors of the cylinder L. Such movement of the actuating handle 10 will again permit the weighted lever 119 to assume its vertical position, in which event the next tie delivered upon the skids 38, 39 will be brought into contact with the extension 120 and fed into the cylinder R. However, should the treatment of the material contained in the cylinder R be unfinished at the time the cylinder L is completely filled with a charge, the actuating handle 10 will be left in its raised position keeping the closure doors of the cylinder R shut. Raising of the actuating handle 10′ to shut the closure doors of the cylinder L will thus bring the several parts into the relative positions indicated in Figs. 21 and 22, resulting not only in a stopping of the live rollers at the inlet ends of the treating cylinders, but permitting the weighted lever 232 to rock the shaft 229 and cause disengagement of the clutch 236 and disconnecting the main drive shaft 26 from the entire conveying mechanism at the charging end of the apparatus. Whenever the doors of either cylinder are opened the clutch 236 will be again engaged setting the charging conveyors into operation and again delivering the ties to the treating cylinders in the manner above described.

After a charge in either cylinder has been treated and the closure doors of that cylinder opened so as to permit the feeding thereto of a new charge, the feeding in of an untreated tie at the inlet end thereof will force a treated tie onto the live roller 194 or 195, as the case may be, adjacent the discharge end 3, 3′ thereof. Rotation of the live roller at the discharge end will longitudinally move the treated tie which rests within the depressions 140 or 141 of the transverse skids 138 or 139, being supported by the rollers 142, 143 disposed therebeneath. Continued longitudinal movement of the treated tie to the position $T^2$ will cause the same to abut the transverse member 193 of the kick-in lever mechanism, the said transverse member being disposed directly in the path of the ties as they are forced from the treating cylinder. Contact of the tie with member 193 rocks the shaft 190 and due to the connection thereof with the movable element of the clutch 188 causes engagement of the said clutch to set the discharging conveyor into operation. The conveyor lugs 154', 155' attached to the respective conveyor chains 154, 155 are thus brought into contact with the side of the treated tie in the manner indicated in Figs. 13 and 14, causing the tie to be transferred along the skids 138, 139 and deposited upon the ladder skids or side members of the vertically swinging lateral section of the discharging conveyor. After being deposited upon the lateral section of the discharging conveyor, the lugs attached to the conveyor chains thereof will be brought into contact with the side of the ties forcing the same downwardly and discharging the same therefrom in an obvious manner.

As long as the end of the treated tie remains in contact with the transverse member 193 of the kick-in lever mechanism, the clutch 188 will be maintained in engaged relation. As soon as the tie moves sufficiently to pass beyond the end of the member 193, the weighted lever 189 will cause the rock shaft 190 to be rocked sufficiently to disengage the clutch and stop the discharging conveyor.

The mode of operation at the discharge end is the same regardless of the side of the car to which the treated ties are removed, the side to which they are discharged being determined solely by the setting of the reverse gear mechanism 180 and the direction of rotation of the discharging conveyor.

The operation of the charging mechanism has been described with the links 124 and 125 connected as shown in Fig. 9, in which event the ties are fed first into the cylinder R. Should it be desirable to feed the ties from the opposite side of the car in the direction indicated by the arrow B at the left hand side of Fig. 8, delivering the ties first into the cylinder L and subsequently into the cylinder R, it is merely necessary to reverse the connections of the links 124 and 125 with the rocking beam 123. The parts arranged for feeding in this manner are clearly indicated in that figure. With the arrangement shown in Fig. 8, the rigid link 124' connects the weighted lever 119 with the lower extremity of the rocking beam 123, and the flexible link 125'—126' connects the weighted lever 121 at a corresponding point of the said beam. When the parts are arranged for feeding from the left hand side of the car, as viewed in said figure, the cable 127 is shifted to connect the lower extremity of the weighted lever 121 with the actuating handle 10' used in connection with the treating cylinder L, so that upon shutting of the closure doors of the cylinder L after the same has been filled, the upper extremity 122 will be moved to the dotted line position indicated at 122$^b$ so as to permit the ties to pass freely across the skids 38 and 39 into contact with the upper extension 120 of the weighted lever 119 and into alignment with the treating cylinder R. In other respects, the operation of the charging mechanism is identical with that described in connection with the feeding of the ties from the right hand side of the car and consequently need not be described in greater detail.

It is thus seen that the invention provides a charging and discharging apparatus for selectively feeding the material to be treated into either of a pair of treating cylinders and discharging the same from either side thereof after removal subsequent to treatment thereof, providing an apparatus which is entirely automatic, easy to manipulate, which is substantially fool-proof, and which is universal in its method of handling the material at both the charging and discharging ends. It is also seen that although the apparatus is particularly adapted for use in connection with portable treating plants, the same is also suitable for use in connection with stationary plants, and the detailed construction of the several parts comprising the entire apparatus may be varied in many respects without departing from the spirit of the invention. It is therefore not intended to limit the invention beyond that particularly pointed out and defined in the appended claims.

We claim:

1. In combination in a wood-treating apparatus, a treating cylinder, a conveyor for transversely feeding the articles to be treated into alignment with the cylinder, a second conveyor for moving the same longitudinally into the treating cylinder, driving means for actuating both said conveyors, and means operated by movement of said articles for connecting and disconnecting the driving means and conveyors.

2. In combination in a wood-treating apparatus, a treating cylinder, a conveyor for transversely feeding the articles to be treated into alignment with the cylinder, a second conveyor for moving the same longitudinally into the treating cylinder, driving means for actuating both said conveyors, means operated by movement of said articles for disconnecting the said driving means from the first-named conveyor while simultaneously connecting the driving means and second-named conveyor.

3. In combination in a wood-treating apparatus, a treating cylinder, a conveyor for transversely feeding the articles to be treated into alignment with the cylinder, said transversely feeding conveyor comprising a main section and a lateral section pivoted thereto, a second conveyor for moving the articles longitudinally into the treating cylinder, driving means for actuating both said conveyors, clutches interposed in the driving connections for each of said conveyors, and means operated by movement of the said articles for simultaneously and oppositely actuating the said clutches.

4. In combination in a wood-treating apparatus, a treating cylinder, a conveyor for transversely feeding the articles to be treated into alignment with the cylinder, a second conveyor for moving the same longitudinally into the treating cylinder, driving means for actuating both said conveyors, clutches interposed in the driving connections to each of said conveyors, and a weighted lever normally urging the clutch for the transversely feeding conveyor into engagement and that for the longitudinally feeding conveyor out of engagement, said lever being positioned in the path of transverse movement of said articles and adapted to be moved by abutment of the articles therewith, whereby to respectively disconnect and connect the first and second-named clutches.

5. In combination in a wood-treating apparatus, a treating cylinder, skids disposed adjacent the end thereof, a transversely feeding conveyor for delivering the articles to be treated thereupon and in alignment with the treating cylinder, a second conveyor for longitudinally feeding the said articles into the treating cylinder, common driving means for both said conveyors, clutches interposed in the driving connections from the driving means to each of said conveyors, a weighted lever having one end extending above the said skids and in the path of the said articles thereon for normally urging one of said clutches into engagement and the other out of engagement, and operative connections between the lever and clutches, the extension of said lever being adapted to be moved during contact with said articles when brought into alignment with the cylinder to actuate said clutches to stop the transversely feeding conveyor and start the longitudinally feeding conveyor.

6. In combination in a wood-treating apparatus, a treating cylinder, means for delivering the articles to be treated into alignment with the cylinder at the inlet end thereof, means intermittently set in operation by movement of the articles into such position for feeding the same into the cylinder, discharge means for removing the treated articles from the outlet end of the cylinder, the feeding of an article into the inlet forcing a treated article out of the outlet of the cylinder and into position to be operated upon by the said discharging means, the said discharging means being intermittently set in operation by movement of the treated article into the last-named position.

7. In combination in a wood-treating apparatus, a plurality of treating cylinders, a transversely feeding conveyor for delivering the articles to be treated to a position in alignment with said cylinders, a longitudinally feeding conveyor for moving the articles into the cylinders, driving means for actuating the conveyors, clutches interposed in the connections between the driving means and conveyors, a weighted lever adjacent each cylinder in the path of the transverse movement of the articles, both said levers normally urging the clutch in the driving connections for the transversely feeding conveyor into engagement and the clutch in the driving connections for the longitudinally feeding conveyor out of engagement, said levers being adapted to be moved by contact therewith by the said articles to disconnect and connect said respective clutches, closure doors for the respective cylinders, separate means for actuating the doors of the respective cylinders, and operative connections between the door actuating means of one cylinder and the said weighted lever of another cylinder, whereby to render the said weighted lever inoperative upon closure of said doors.

8. In combination in a wood-treating apparatus, a pair of treating cylinders, a conveyor for selectively delivering articles to be treated into alignment with either cylinder at the inlet end thereof, a conveyor for moving the articles into the cylinders, a common driving means for both conveyors, a clutch interposed in said driving means, closure doors for each cylinder, separate actuating means for the doors of each cylinder, and operative connections from each of said actuating means to said clutch, the said connections being so arranged as to disconnect said clutch only upon movement of both the actuating means to close the doors of both the cylinders.

9. In combination in a wood-treating apparatus, a treating cylinder, a live roller adjacent the inlet of said cylinder, a closure door for the cylinder, a transversely feeding conveyor for moving the articles to be treated into alignment with the cylinder, a longitudinally feeding conveyor for moving the articles onto the live roller, a main driving shaft for said conveyors and live roller, driving connections between said shaft and conveyors for actuating the same, clutches interposed in said driving connections, means normally urging the clutch in the connections for the transversely feeding conveyor into engagement and maintaining the clutch in the connections for the longitudinal feeding conveyor disengaged, said means being adapted to be contacted by the articles during their transverse movement to disengage and engage the respective clutches, means for actuating the closure doors, a clutch interposed in the driving connections for the live roller, the said actuating means being connected to the last-named clutch to disengage the same upon closure of said closure door.

10. In combination in a wood-treating apparatus, a treating cylinder, a longitudinally feeding conveyor adjacent the charging end thereof for carrying the articles to be treated into the cylinder, a live roller adjacent the discharge end of the cylinder adapted to longitudinally move the treated articles forced into contact therewith by the feeding of untreated articles into the charging end, a transverse discharging conveyor adjacent the discharging end of the cylinder for laterally moving the articles fed thereto by the live roller, driving means for said discharging conveyor, means normally disconnecting the driving means and discharging conveyor, said means being positioned in the longitudinal path of the articles as they pass from the treating cylinder and adapted to be actuated during contact therewith to connect said driving means and discharging conveyor.

11. In combination in a wood-treating apparatus, a treating cylinder, a longitudinally feeding conveyor adjacent the charging end thereof for carrying the articles to be treated into the cylinder, a live roller adjacent the discharge end of the cylinder adapted to longitudinally move the treated articles forced therein by the feeding of untreated articles into the charging end, a transversely discharging conveyor adjacent the discharge end of the cylinder for laterally moving the articles fed thereto by the live roller, the discharging conveyor comprising a main section and a vertically swinging lateral section, driving means for said discharging conveyor, means normally disconnecting the driving means and discharging conveyor, said means being positioned in the longitudinal path of the treated articles and adapted to be actuated during contact therewith to connect said driving means and discharging conveyor.

12. In combination in a wood-treating apparatus, a treating cylinder, a longitudinally feeding conveyor adjacent the charging end thereof for carrying the articles to be treated into the cylinder, a transversely discharging conveyor adjacent the discharge end of the cylinder for laterally moving the articles fed thereto by the feeding of an untreated article into the charging end, driving means for said discharging conveyor, a clutch interposed in the connections between the driving means and conveyor, a weighted lever urging the clutch out of engagement, said lever being positioned in the longitudinal path of the treated article and adapted to be moved during contact therewith to cause engagement of said clutch.

13. In combination in a wood-treating apparatus, a treating cylinder, a longitudinally feeding conveyor adjacent the charging end thereof for carrying the articles to be treated into the cylinder, transverse skids adjacent the discharge end of the cylinder, a transversely discharging conveyor contiguous said skids adapted to move the articles deposited on the skids, driving means for said discharging conveyor, a clutch interposed in the connections between the driving means and conveyor, a weighted lever normally urging the clutch out of engagement, a portion of said lever extending above the upper surface of the skids and in the path of movement of the treated articles, the extension of the lever being adapted to be moved during contact therewith to engage the clutch.

14. In combination in a wood-treating apparatus, a treating cylinder, a longitudinally feeding conveyor adjacent the charging end thereof for carrying the articles to be treated into the cylinder, a transversely discharging conveyor adjacent the discharging end of the cylinder for laterally moving the articles fed thereto by the feeding of an untreated article into the charging end, driving means for said discharging conveyor, means for reversing the direction of rotation of the driving means whereby to discharge the treated articles to either side of the cylinder, a clutch interposed in the connections between the driving means and conveyor, a weighted lever urging the clutch out of engagement, said lever being positioned in the longitudinal path of the treated articles and adapted to be moved during contact therewith to cause engagement of said clutch.

15. In combination in a wood-treating apparatus, a treating cylinder, a longitudinally feeding conveyor adjacent the charging end of the cylinder for carrying the articles to be treated into the cylinder, transverse skids adjacent the discharge end of the cylinder, a transversely discharging conveyor contiguous said skids adapted to move the articles deposited on the skids, means for reversing the direction of rotation of the driving means, whereby to discharge the treated articles to either side of the cylinder, a clutch interposed in the connections between the driving means and conveyor, a weighted lever urging the clutch out of engagement, a portion of said lever extending above the upper surface of the skids and in the path of the movement of the treated articles, the extension of the lever being adapted to be moved during contact therewith to cause engagement of the clutch.

16. In combination in a wood-treating apparatus, a treating cylinder, skids disposed adjacent the charging end thereof, a transversely feeding conveyor for delivering the articles to be treated thereupon and in alignment with the treating cylinder, a second conveyor for longitudinally feeding the said articles into the charging cylinder; common driving means for both said conveyors, clutches interposed in the driving connections from the driving means to each of said conveyors, a weighted lever having one end extending above the said skids and in the path of the articles thereon for normally urging one of said clutches into engagement and the other out of engagement, operative connections between the lever and clutches, the extension of said lever being adapted to be moved during contact with said articles when brought into alignment with the cylinder, to actuate said clutches to stop the transversely moving conveyor and start the longitudinally moving conveyor, transverse skids adjacent the discharge end of the cylinder, a transversely discharging conveyor contiguous said skids adapted to move the articles deposited on the skids, driving connections between said driving means and discharging conveyor, a clutch interposed in said driving connections, a weighted lever normally urging the last-named clutch out of engagement, a portion of said lever extending above the upper surface of the last-named skids and in the path of movement of the treated articles, the extension of the lever being adapted to be moved during contact therewith to cause engagement of the last-named clutch.

17. In combination with a wood treating apparatus, a treating cylinder, a conveyor for feeding the articles to be treated into alignment with the cylinder, driving means for said conveyor, and means operated by movement of said articles for connecting and disconnecting the said driving means and conveyor.

18. In combination with a wood treating apparatus, a treating cylinder, a conveyor for intermittently feeding the articles to be treated into alignment with the cylinder, driving means for said conveyor, and means operated by the movement of said articles for alternately connecting and disconnecting the said driving means and conveyor.

19. In combination with a wood treating apparatus, a treating cylinder, means for conveying the articles to be treated into alignment with the cylinder, means for feeding the articles into the cylinder, driving means for each of the said conveying and feeding means, and means for operatively disconnecting the conveying means from its driving means while connecting the feeding means from the driving means therefor.

20. In combination with a wood treating apparatus, a treating cylinder, skids disposed in alignment with the cylinder, conveying means for depositing articles to be treated on said skids, means for feeding the articles from the skids into the cylinder, driving means for the conveying and feeding means, and means operated by the articles upon the skids for maintaining the driving means disconnected from the said conveying means during the actuation of the feeding means.

21. In combination with a wood treating apparatus, a treating cylinder, skids disposed in alignment with the cylinder, conveying means for depositing articles to be treated on said skids, means for feeding the articles from the skids into the cylinder, driving means for the conveying and feeding means, and means for disconnecting the conveying means while connecting the feeding means from the said driving means.

In testimony whereof, we hereunto sign our names.

GRANT B. SHIPLEY.
JACK B. SHIPLEY.

Witnesses:
M. R. HOLLIDAY,
J. S. STOCKDALE.